(12) United States Patent
Suhling

(10) Patent No.: US 10,766,109 B2
(45) Date of Patent: Sep. 8, 2020

(54) EZ SPEEDY FENCE MOUNT

(71) Applicant: Robert James Suhling, Waukegan, IL (US)

(72) Inventor: Robert James Suhling, Waukegan, IL (US)

( * ) Notice: Subject to any disclaimer, the term of this patent is extended or adjusted under 35 U.S.C. 154(b) by 198 days.

(21) Appl. No.: 16/010,194

(22) Filed: Jun. 15, 2018

(65) Prior Publication Data
US 2019/0381614 A1    Dec. 19, 2019

(51) Int. Cl.
*B23Q 3/00*  (2006.01)
*B23Q 1/28*  (2006.01)
*B27B 27/00* (2006.01)

(52) U.S. Cl.
CPC .............. *B23Q 3/007* (2013.01); *B23Q 1/28* (2013.01); *B27B 27/00* (2013.01)

(58) Field of Classification Search
CPC ......... F16B 37/045; B23Q 3/007; B23Q 1/42; B23Q 3/005; B27C 5/02; B27C 5/04; B27C 5/06; Y10T 409/305544; Y10T 409/309072; Y10T 409/309016
See application file for complete search history.

(56) References Cited

U.S. PATENT DOCUMENTS

| | | | | |
|---|---|---|---|---|
| 4,948,313 A | * | 8/1990 | Zankovich | E04B 1/4107 411/103 |
| 5,647,707 A | * | 7/1997 | Poulin | B23Q 1/626 144/135.2 |
| 2018/0030717 A1 | * | 2/2018 | Yang | E04B 1/2403 |
| 2018/0187411 A1 | * | 7/2018 | Shang | F16B 7/187 |

* cited by examiner

*Primary Examiner* — Daniel J Colilla
(74) *Attorney, Agent, or Firm* — Lesley A. Wallerstein, LLC

(57) ABSTRACT

The invention allows for alignment perpendicular to a track engaged by a securing nut. An opposing tooth key type aligner has two functions: keeps the second track perpendicular to the first track and allows the securing nut to always be correctly oriented to engage with the track. A bolt clamps the securing nut to the track to lock the position of the invention. A second axis perpendicular to the lower track is created with a second track. A bolt connected to a coupler nut engages with the middle track to create a third axis perpendicular to both previous axes. A washer provides a neutral bearing surface between the coupler nut and second track. An elevation bolt sets the vertical position of the object to be mounted. A bolt can be used to fasten an object to the end of the elevation bolt.

1 Claim, 8 Drawing Sheets

EZ SPEEDY FENCE MOUNT

CROSS REFERENCE TO RELATED APPLICATION (not applicable)

STATEMENT REGARDING FEDERALLY SPONSORED RESEARCH OR DEVELOPMENT (not applicable)

NAMES OF PARTIES TO A JOINT RESEARCH AGREEMENT (not applicable)

REFERENCE TO SEQUENCE LISTING, A TABLE OR A COMPUTER PROGRAM LISTING COMPACT DISC APPENDIX (not applicable)

FIELD OF THE INVENTION

The present invention relates generally to securing fences to machinery for the purposes of linear measuring and gauging, and more specifically, it relates to positioning a fence in all three axes of translation to acquire a precise surface for linear measuring and gauging of a work piece.

DESCRIPTION OF THE PRIOR ART

There is prior art of a mounting device made for an open track miter saw stand. It is a positioning mount that allows for vertical and horizontal positioning in relation to a fixed track. To use said mounting device, the user would need to remove the original work support that comes with the stand. They would then slide two of said prior art mounts into the open track and attach a work surface to the top of the mounts.

The main problem with said prior art is the time and difficulty required to set the system up. The system consists of multiple components which must be placed individually into the track after removing an original component from the track. To do this, they have to align a piece of the mount, which spins freely, with the track. Having to manually align the piece increases the difficulty required. The work surface must then be placed onto the mounts after they are set up. Having to insert and position multi components results in a long set up time. The same is also true for removing the work surface and mounts for transportation purposes. Keeping track of the original removed component is also a nuisance.

SUMMARY OF THE INVENTION

A primary object of present invention is to provide a mount that will overcome the shortcomings of the prior art devices.

Another object is to provide a mount system that reduces installation time when compared to other open-ended track mounting devices.

Another object is to provide a mount system that reduces the skill needed for installation.

Another object is to provide a mount system that keeps all of the components connected as a single entity for transportation or storage purposes.

Another object is to provide a mount system that has a rigid connection between a work surface and an open track.

Another object is to provide a mount system that allows for positioning of a supported work surface in all three axes of movement.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

REFERENCE NUMERALS

Figure 1:
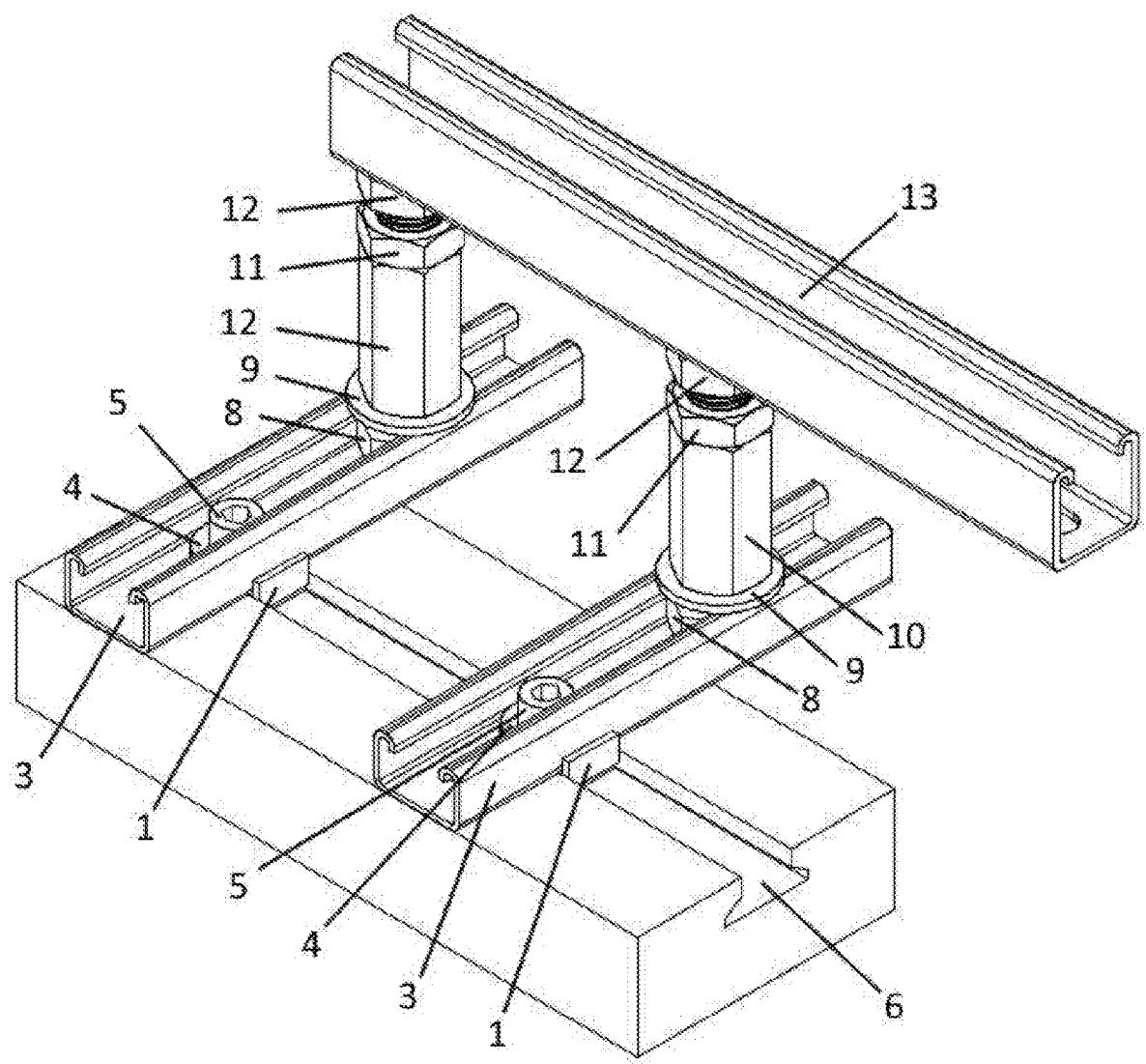
FIG. 1 is an upper perspective view of the present invention inserted into an open-ended track.
Figure 2:
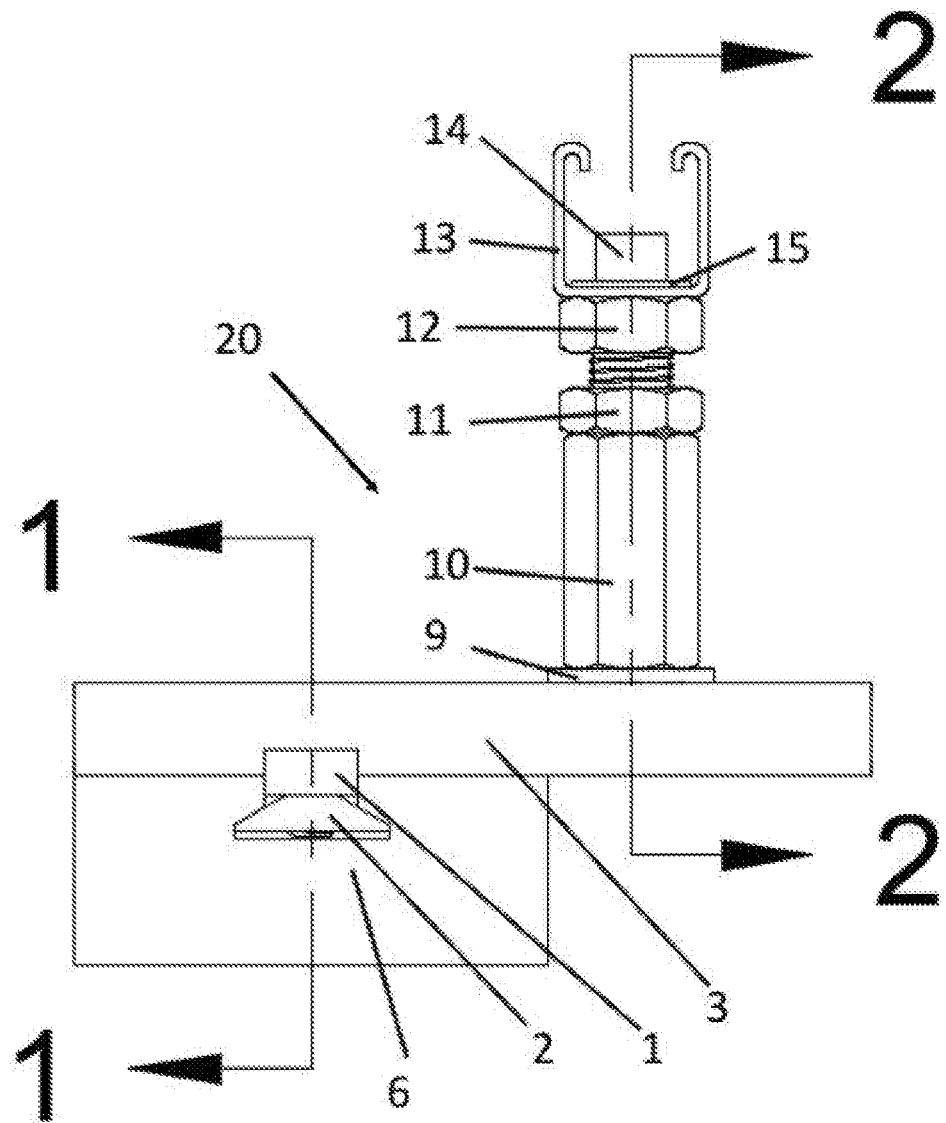
FIG. 2 is a side view of the present invention inserted into an open-ended track.
Figure 3:
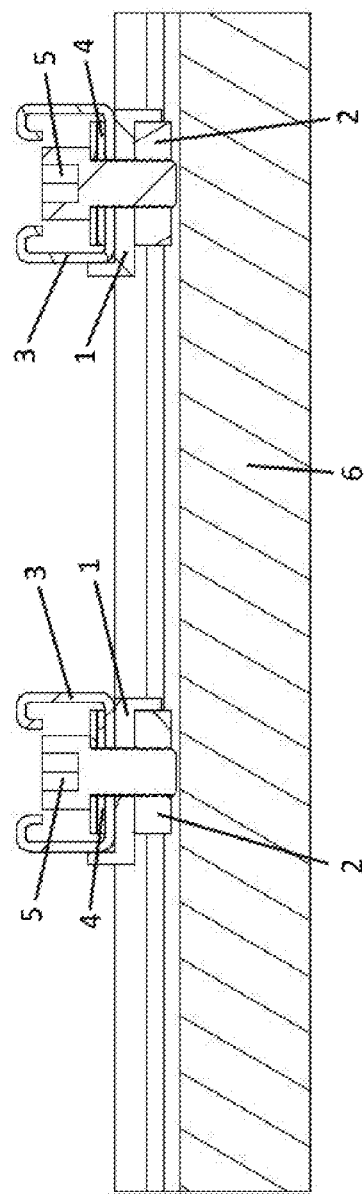
FIG. 3 is a cross sectional view taken along line 1-1 of FIG. 2.
Figure 4:
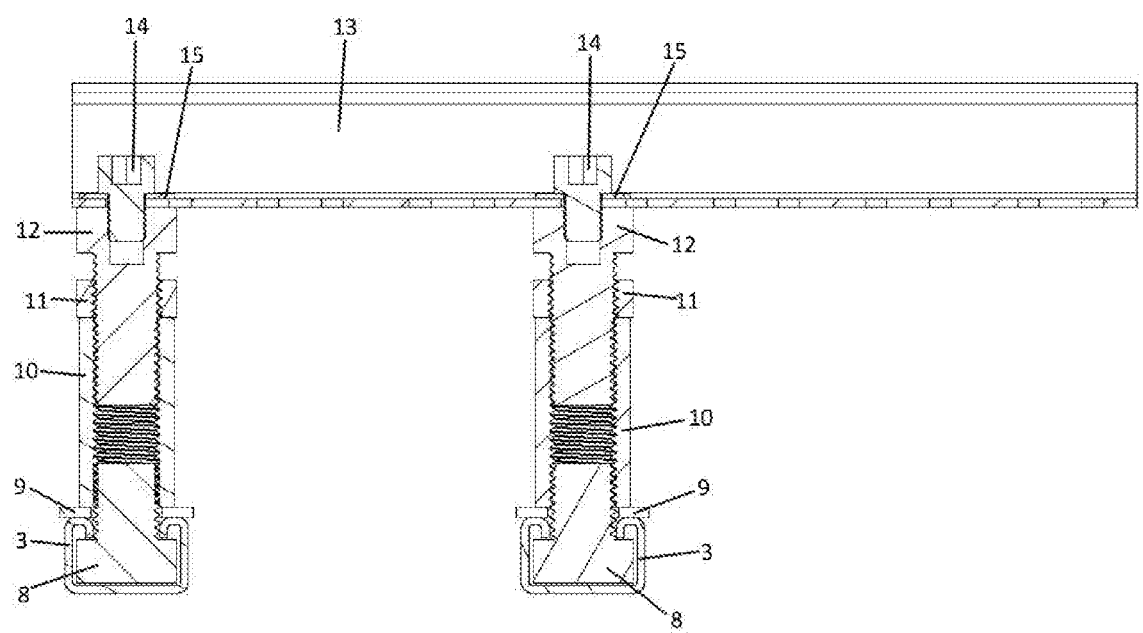
FIG. 4 is a cross sectional view taken along line 2-2 of FIG. 2.
Figure 5:
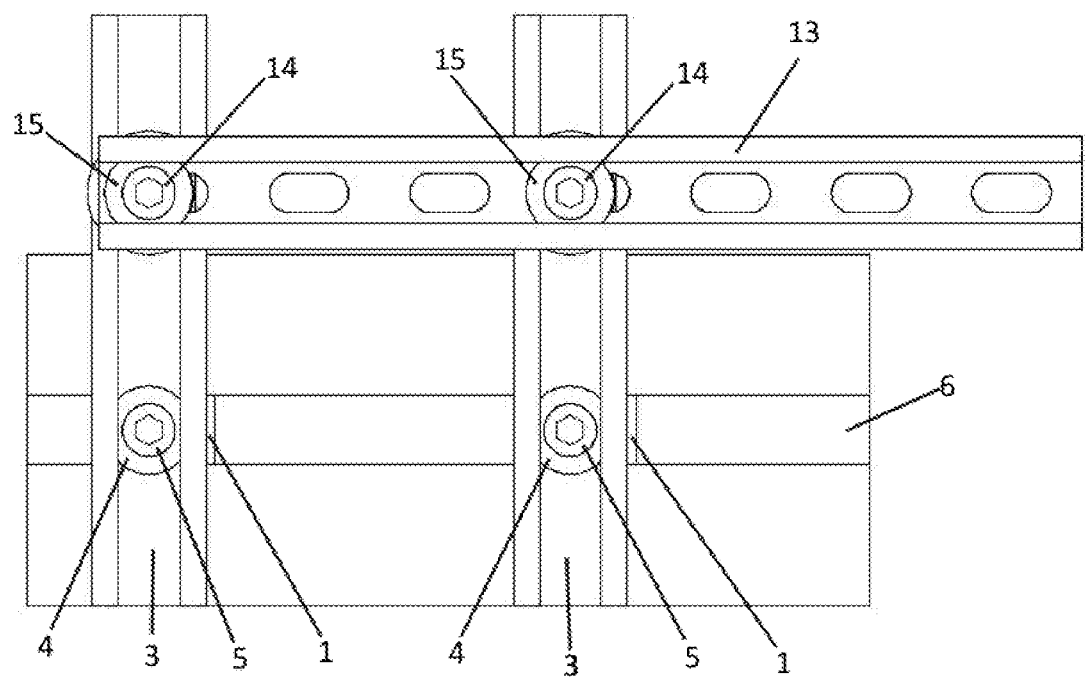
FIG. 5 is a top view of the present invention inserted into an open-ended track.

1. Opposing tooth key aligner guide
2. Securing nut
3. Y-axis track
4. Washer
5. Securing bolt
6. Lower x-axis track
8. Anchor bolt
9. Washer
10. Coupler nut
11. Securing nut
12. Elevation bolt
13. Upper x-axis track
14. Mounting bolt
15. Washer
16. Aperture
17. Main foundation surface of tooth key type aligner guide
18. Positive tooth of tooth key type aligner guide
19. Negative tooth of tooth key type aligner guide
20. EZ Speedy Fence Mount

DETAILED DESCRIPTION OF THE PREFERRED EMBODIMENT

FIGS. 1 through 5 illustrate an EZ Speedy Fence Mount 20. The preferred embodiment of the present invention consists of two EZ Speedy Fence Mounts 20 and an upper x-axis track 13 to be used for linear measuring or gauging purposes. Depending on the application, fewer or more fence mounts 20 can be used to achieve the desired result. Broadly, EZ Speedy Fence Mount 20 provides means to simultaneously position along three dimensions an upper x-axis track 13 relative to a mounting surface. The mounting surface has cut from within a lower x-axis track 6. A pair of y-axis tracks 3 are selectively secured against, and slide left and right along, the mounting surface. Y-axis tracks 3 are tightened perpendicularly against the mounting surface by a securing nut 2, washer 4 and securing bolt 5 that sit within track 6, and below the mounting surface. A tooth key aligner guide 1 is dimensioned to snugly sit within lower x-axis track 6 and ensures y-axis tracks 3 can move left and right in a horizontal plane along and relative to the mounting surface. Guide 1 retains the securing nut, washer and bolt in place within track 6 and below the mounting surface.

The pair of y-axis tracks 3 also have downstream means for clamping to them and selectively elevating relative to y-axis tracks 3, an upper x-axis track 13. The clamping and elevation means comprise a co-planar and parallel pair of rigid and selectively vertically adjustable elevation bolts 12. Elevation bolts 12 have two ends: a lower end comprising anchor bolt 8, washer 9 and coupler nut 10 threadedly retained within and be tightened against y-axis tracks 3, and an upper end threadedly retained within and secured within the upper x-axis track 13. Upper end of elevation bolts 12 comprises a mounting bolt 14, washer 15. Apertures 16 within upper x-axis tracks 13 allow tracks 13 to be clamped to the elevation means.

A user can adjust the height of elevation bolt 12 up and down by rotating coupler nut 10. The elevation means operate in tandem, as one plane, to enable a user to move the upper x-axis track frontward and backward along the y-axis tracks as a single, coplanar, unit. This system creates three directions in which the upper x-axis track can be selectively positioned relative to the mounting surface: left to right, front to back, and up and down.

The mounting surface has along a lower x-axis track cut therefrom. Two comprises a securing nut 2, held in the correct position by an opposing tooth key aligner guide 1 that fits snugly within the lower x-axis track 6. The opposing tooth key type aligner guide 1 is held in position by the track 3. A securing bolt 5 and a washer 4 provide a clamping force with the engagement nut 2 to secure the desired position in the open-ended track 6. Track 3 extends perpendicularly from the open-ended track 6. This creates a second axis of positional adjustment.

Figure 6:
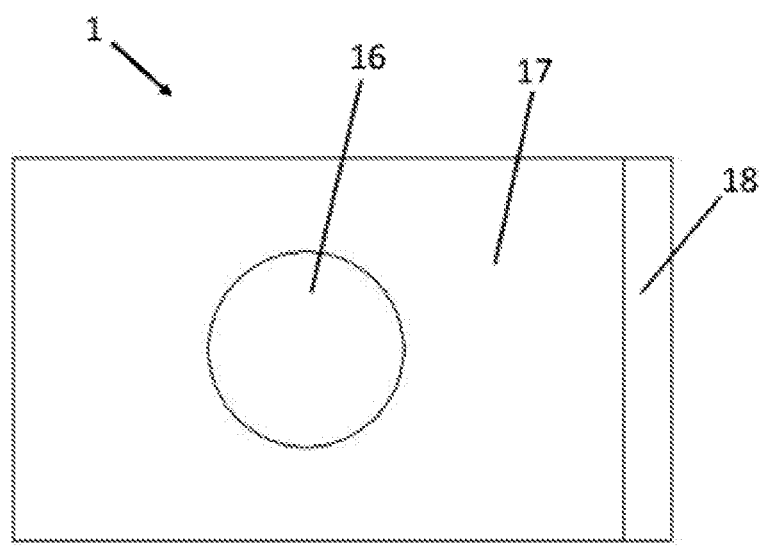
FIG. 6 is a top view of an opposing tooth key type aligner.
Figure 7:
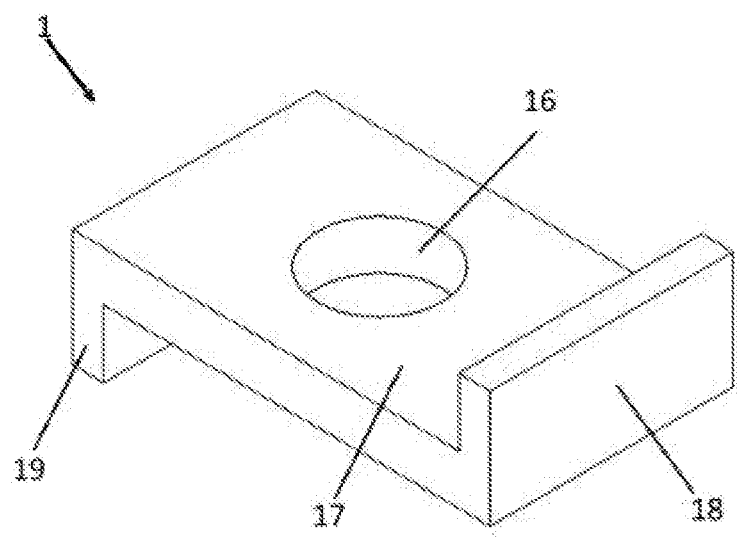
FIG. 7 is an upper perspective view of the opposing tooth key type aligner.
Figure 8:
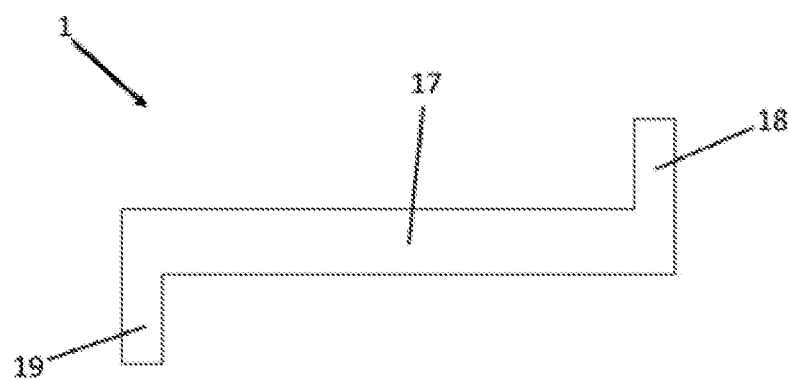
FIG. 8 is a front view of the opposing tooth key type aligner.

More detail is shown in FIGS. 6 through 8 for one of the more important components: the opposing tooth key aligner guide 1. It has a main foundation surface 17. Within the main foundation surface 17 is an aperture 16. In other embodiments, the aperture 16 can exist anywhere, or have any geometry within the main foundation surface 17. The positive tooth 18 is shown protruding from the top face and right-most side of the main foundation surface 17. In other embodiments, the positive tooth 18 (or teeth) can exist in any placement, orientation, or geometry protruding from the top face of the main foundation surface 17.

The aperture 16 starts at the top face of the main foundation surface 17 and extends to the bottom face of the main foundation surface 17. The main foundation surface 17 is dimensioned to fit snugly within the lower x-axis track 6 and y-axis track 3. In other embodiments, the length, width, and/or depth can extend greater or lesser than the dimensions of the positive tooth 18 and/or the negative tooth 19. The negative tooth 19 is shown protruding from the bottom face and left-most side of the main foundation surface 17. In other embodiments, the negative tooth 19 (or teeth) can exist in any placement, orientation, or geometry protruding from the bottom face of the main foundation surface 17. The positive tooth 18 and negative tooth 19 extrude from the p and bottom faces, respectively, of the main foundation surface 17 in a perpendicular manner.

In other embodiments, the positive tooth 18 and negative tooth 19 can protrude at any angle from 0 degrees to 180 degrees with respect to the main foundation surface 17, not including 0 degrees or 180 degrees. The main foundation surface 17 is shown with its top and bottom faces parallel. In other embodiments, the top and bottom faces can have any geometry.

In use, the EZ Speedy Fence Mount 20 is slid into a lower x-axis track 6. No skill is required because the opposing tooth key aligner guide 1 guides securing nut 2 automatically into the lower x-axis track 6. It is positioned in a location that may or may not be predetermined, and then secured with securing bolt 5. The EZ Speedy Fence Mount 20 is now ready to be adjusted to the correct position in the two remaining planes. Clamping and elevation means can be moved as a pair along y-axis track 3 to the desired distance toward or away from the lower x-axis track 6. By rotating the coupler nut 10, the clamping and elevation means can be locked down into the desired position along y-axis tracks 3. The elevation bolt 12 can also be rotated to raise or lower the upper x-axis track. Once all adjustments are made, securing nut 11 is tightened to hold the new position.

In the primary embodiment, upper x-axis track 13 is adjusted and secured left to right, front to back, and up and down relative to the mounting surface. Upper x-axis track 13 still has space within the track for attaching and rigidly supporting any object, such as a measuring or gauging tool. A linear stop block can optionally be inserted into upper x-axis track 13 for gauging or measuring material to the desired lengths. For horizontal supports, roller assemblies or a horizontal surface can also be mounted to upper x-axis track 13. If the user wants to remove the entire structure, they only need to loosen securing bolts 5 and slide the entire structure off the mounting surface as one unit.

Although embodiments and examples of the invention have been shown and described, it is to be understood that various modifications, substitutions and rearrangements of parts, components, and/or process (method) steps, as well as other uses, shapes, construction and design of this EZ Speedy Fence Mount can be made by those skilled in the art without departing from the novel spirit and scope of this invention.

I claim:
1. A fence mount comprising:
   a. a mounting surface having a lower X-axis track cut therefrom;
   b. means for slidably positioning and securing within the lower X-axis track and against the mounting surface, a Y-axis track perpendicular to the lower X-axis track, wherein the slidable positioning and securing means within the lower X-axis track comprises a tooth key aligner guide dimensioned to snugly fit within the lower X-axis track;
   c. means for slidably positioning within, securing within and selectively elevating from, the Y-axis track an upper X-axis track perpendicular to both the Y-axis track and the lower X-axis track.

* * * * *